(12) United States Patent
Chen

(10) Patent No.: US 10,153,562 B1
(45) Date of Patent: Dec. 11, 2018

(54) PATCH CORD CONNECTING METAL TERMINAL HAVING A PUSHBUTTON ON A LATERAL SIDE OF A RESILIENT ARM

(71) Applicant: Xiamen GHGM Industrial Trade Co., Ltd., Xiamen (CN)

(72) Inventor: Bingshui Chen, Xiamen (CN)

(73) Assignee: XIAMEN GHGM INDUSTRIAL TRADE CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/807,542

(22) Filed: Nov. 8, 2017

(51) Int. Cl.
| | |
|---|---|
| H01R 4/48 | (2006.01) |
| H01R 4/2429 | (2018.01) |
| H01R 13/506 | (2006.01) |
| H01R 13/518 | (2006.01) |
| H01R 4/02 | (2006.01) |
| H01R 13/641 | (2006.01) |
| H01R 31/06 | (2006.01) |
| H04Q 1/14 | (2006.01) |
| H01R 13/58 | (2006.01) |

(52) U.S. Cl.
CPC .......... *H01R 4/2429* (2013.01); *H01R 4/029* (2013.01); *H01R 4/4836* (2013.01); *H01R 13/506* (2013.01); *H01R 13/518* (2013.01); *H01R 13/641* (2013.01); *H01R 31/06* (2013.01); *H01R 13/58* (2013.01); *H04Q 1/149* (2013.01)

(58) Field of Classification Search
CPC ...... H01R 4/48; H01R 4/4818; H01R 4/4836; H01R 11/282; H01R 13/703; H01R 4/4845

USPC ....... 439/437, 438, 441, 835, 852, 862, 884, 439/888, 889
See application file for complete search history.

(56) References Cited

U.S. PATENT DOCUMENTS

| | | | | |
|---|---|---|---|---|
| 5,938,484 A * | 8/1999 | Beege | ............. | H01R 4/4845 439/828 |
| 6,010,376 A * | 1/2000 | Kollmann | ............. | H01R 4/4827 439/803 |
| 6,283,801 B1 * | 9/2001 | Guinda | ............. | H01R 4/4845 439/787 |
| 6,796,855 B2 * | 9/2004 | Fricke | ............. | H01R 4/4818 439/835 |
| 6,827,614 B2 * | 12/2004 | Bechaz | ............. | H01R 4/4845 439/828 |
| 7,287,999 B2 * | 10/2007 | Holterhoff | ............. | H01R 4/4836 439/441 |
| 7,699,621 B2 * | 4/2010 | Zhang | ............. | H01R 13/2442 439/74 |

(Continued)

*Primary Examiner* — Chandrika Prasad
(74) *Attorney, Agent, or Firm* — Muncy, Geissler, Olds & Lowe, P.C.

(57) ABSTRACT

A pushbutton-equipped patch cord connecting metal terminal is disclosed. The metal terminal has a base on which weld legs are formed. The base has its front part bent backward to form an arc-shaped resilient portion. The arc-shaped resilient portion has its tail end extending backward to form a tilted resilient arm that points the upper rear of the metal terminal. A pushbutton is formed at a lateral of the resilient arm. Also provided is a patch cord connector is composed of the metal terminal and a housing seat. The metal terminal and the connector are structurally simple and easy to use, while ensuring good electrical connection to a patch cord as well as convenient repeated plugging and unplugging of the patch cord.

7 Claims, 8 Drawing Sheets

(56) References Cited

U.S. PATENT DOCUMENTS

| | | | | |
|---|---|---|---|---|
| 8,517,780 B2 * | 8/2013 | Yu | ............................ | H01R 12/57 |
| | | | | 439/862 |
| 9,806,442 B2 * | 10/2017 | Geske | ..................... | H01R 12/55 |
| 9,899,752 B2 * | 2/2018 | Wu | ....................... | H01R 4/4818 |

* cited by examiner

PATCH CORD CONNECTING METAL TERMINAL HAVING A PUSHBUTTON ON A LATERAL SIDE OF A RESILIENT ARM

BACKGROUND OF THE INVENTION

1. Technical Field

The present invention relates to electrical connectors, and more particularly to a patch cord connecting metal terminal with a pushbutton and a patch cord connector with a pushbutton.

2. Description of Related Art

The existing connectors for connecting patch cords are structurally complex, making their manufacturing require considerable material and significant costs, yet their operation is inconvenient. Besides, after connected to or assembled with such a connector, a patch cord is hard to be unplugged without using a tool or an auxiliary structure. Hence, there is a need for a patch cord connecting metal terminal and a connector having a pushbutton formed thereon.

SUMMARY OF THE INVENTION

The primary objective of the present invention is to provide a pushbutton-equipped patch cord connecting metal terminal and a pushbutton-equipped patch cord connector, which are structurally simple and facilitate plugging and unplugging of a patch cord.

To achieve the foregoing objective, the present invention adopts the following schemes.

A pushbutton-equipped patch cord connecting metal terminal has a base on which weld legs are formed; the base having its front part bent backward to form an arc-shaped resilient portion, the arc-shaped resilient portion having its tail end extending backward to form a tilted resilient arm that points the upper rear of the metal terminal so as to provide a contact for a patch cord to connect, and a pushbutton being formed at a lateral of the resilient arm (next to the contact).

The base has its front and rear ends bent downward to form weld legs, and the weld leg at the rear end has its tail end bent upward to form an upright brace whose top is bent forward to form a horizontal upper contact surface that is parallel to the base, in which the upper contact surface is located above the resilient arm without covering the pushbutton, and the upper contact surface and the resilient arm are separated by a distance so as to provide upper and lower contacts for the patch cord to connect.

A pushbutton-equipped patch cord connector is composed of a metal terminal and a housing seat. The metal terminal is as described above to have a base on which weld legs are formed. The base has its front part bent backward to form an arc-shaped resilient portion, and the arc-shaped resilient portion has its tail end extending backward to form a tilted resilient arm that points the upper rear of the metal terminal so as to provide a contact for a patch cord to connect. A pushbutton is formed at a lateral of the resilient arm (next to the contact). The housing seat has a box-like shape that has an accommodating chamber running through its front and back, the metal terminal being fixed in the accommodating chamber, the weld legs exposed at a bottom of the housing seat for a circuit board to connect, the resilient arm and a top of the housing seat being separated by a distance for insertion, and the housing seat being provided with a push window corresponding to the pushbutton for easy pushing.

Barbs are formed at laterals of the base of the metal terminal, so that the barbs make the metal terminal come into close fit with inner walls of the housing seat and get firmly secured in the housing seat.

The base has its front and rear ends bent downward to form weld legs, and the weld leg at the rear end has its tail end bent upward to form an upright brace whose top is bent forward to form a horizontal upper contact surface that is parallel to the base, in which the upper contact surface is located above the resilient arm without covering the pushbutton, and the upper contact surface and the resilient arm are separated by a distance so as to provide upper and lower contacts for the patch cord to connect, in which the upper contact surface is close to the top of the housing seat.

The upper contact surface is provided with a reverse hook, and the housing seat has its top provided with a hook eye, so that when the reverse hook and the hook eye are engaged with each other, the upper contact surface is secured to the top of the housing seat.

The housing seat has its front end formed with a barricade corresponding to the arc-shaped resilient portion to provide an abutting force when the arc-shaped resilient portion deforms, thereby further ensuring reliable electrical connection between the resilient arm and the patch cord.

By adopting the foregoing schemes, the disclosed metal terminal is structurally simpler as compared to the prior art, and so is the connector. The both are easy to use and reliable. In use, the resilient arm works with a component above it (which may be the housing seat, or another component positionally corresponding to the resilient arm) to firmly clamp the patch cord, and the arc-shaped resilient portion at this time abuts upward against the patch cord, thereby securing the patch cord and the established electrical connection. To remove the patch cord, a user can simply push the pushbutton, which in turn drives the contact between the resilient arm and the patch cord to move downward, and draw the patch cord outward, so the operation is very easy.

The invention as well as a preferred mode of use, further objectives and advantages thereof will be best understood by reference to the following detailed description of illustrative embodiments when read in conjunction with the accompanying drawings.

DETAILED DESCRIPTION OF THE INVENTION

Figure 1:
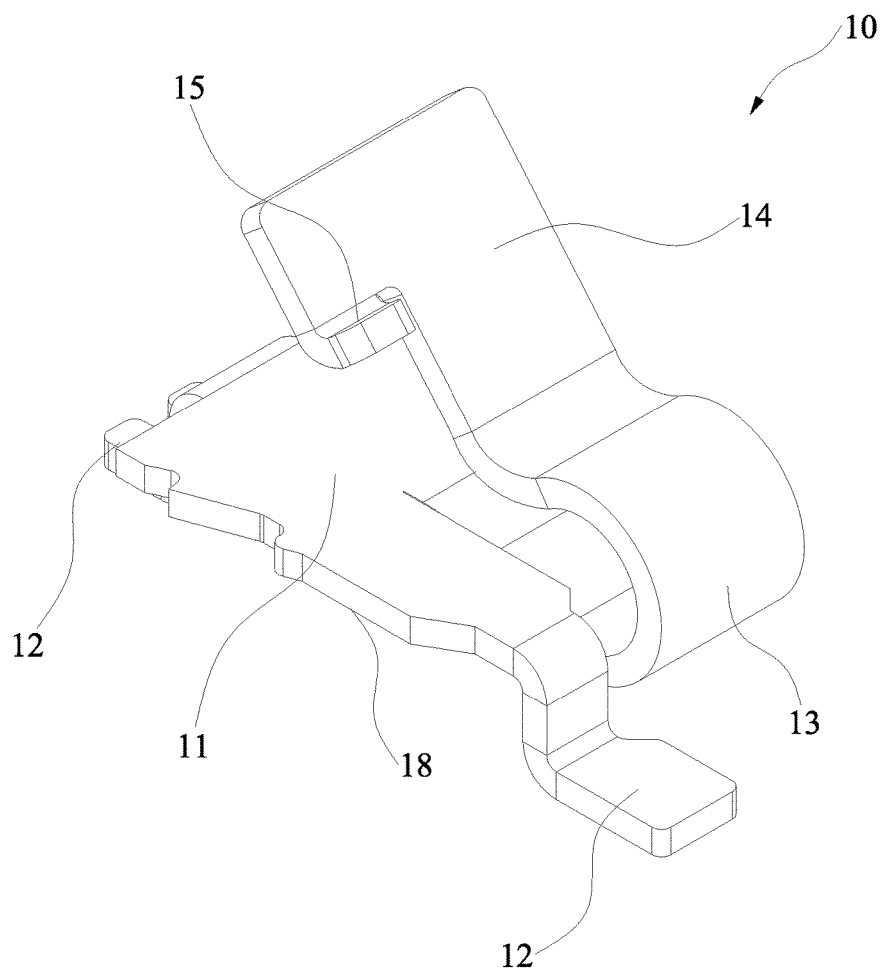
FIG. 1 is a perspective view of a first embodiment of a metal terminal according to the present invention.
Figure 2:
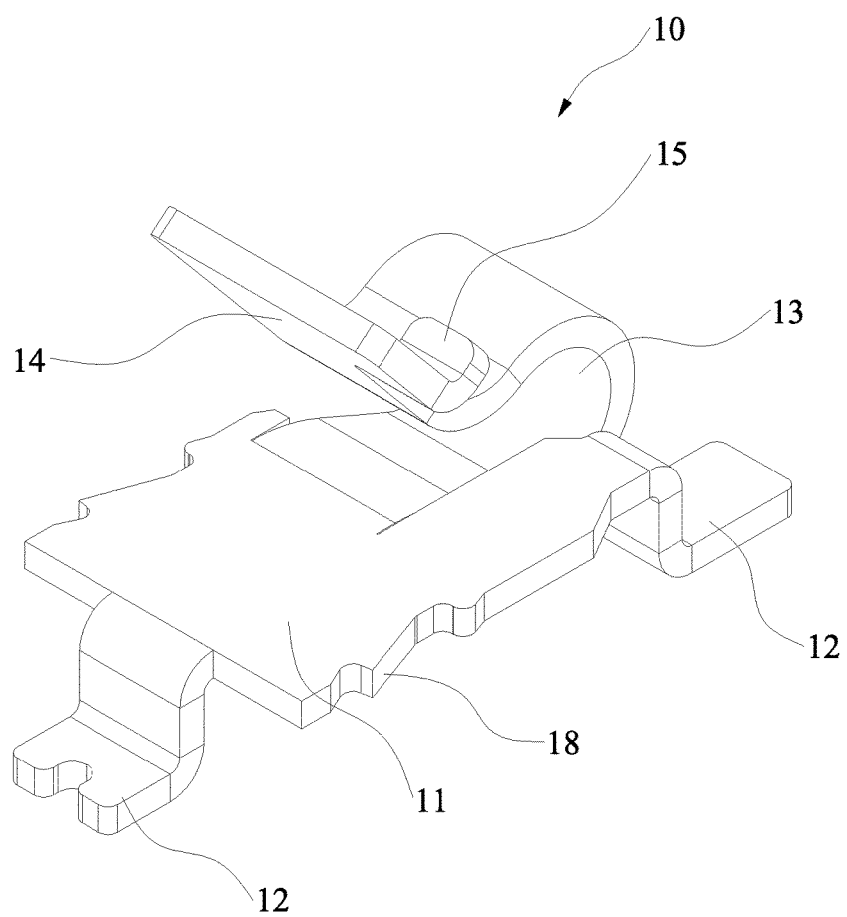
FIG. 2 is another perspective view of the first embodiment of the metal terminal according to the present invention.

Referring to FIG. 1 through FIG. 4, according to one embodiment of the present invention, a pushbutton-equipped patch cord connecting metal terminal 10 has a base 11. The base 11 are formed with weld legs 12. The front part of the base 1 is bent backward to form an arc-shaped resilient portion 13. The arc-shaped resilient portion 13 has its tail end extending backward to form a resilient arm 14. The resilient arm 14 is normally tilted and forms the upper rear of the metal terminal 10. This tilted structure serves to guide the insertion of a patch cord 30 and to act as a contact with the patch cord 30. A pushbutton 15 is formed at the lateral of the resilient arm 14 (next to the contact).

Figure 3:
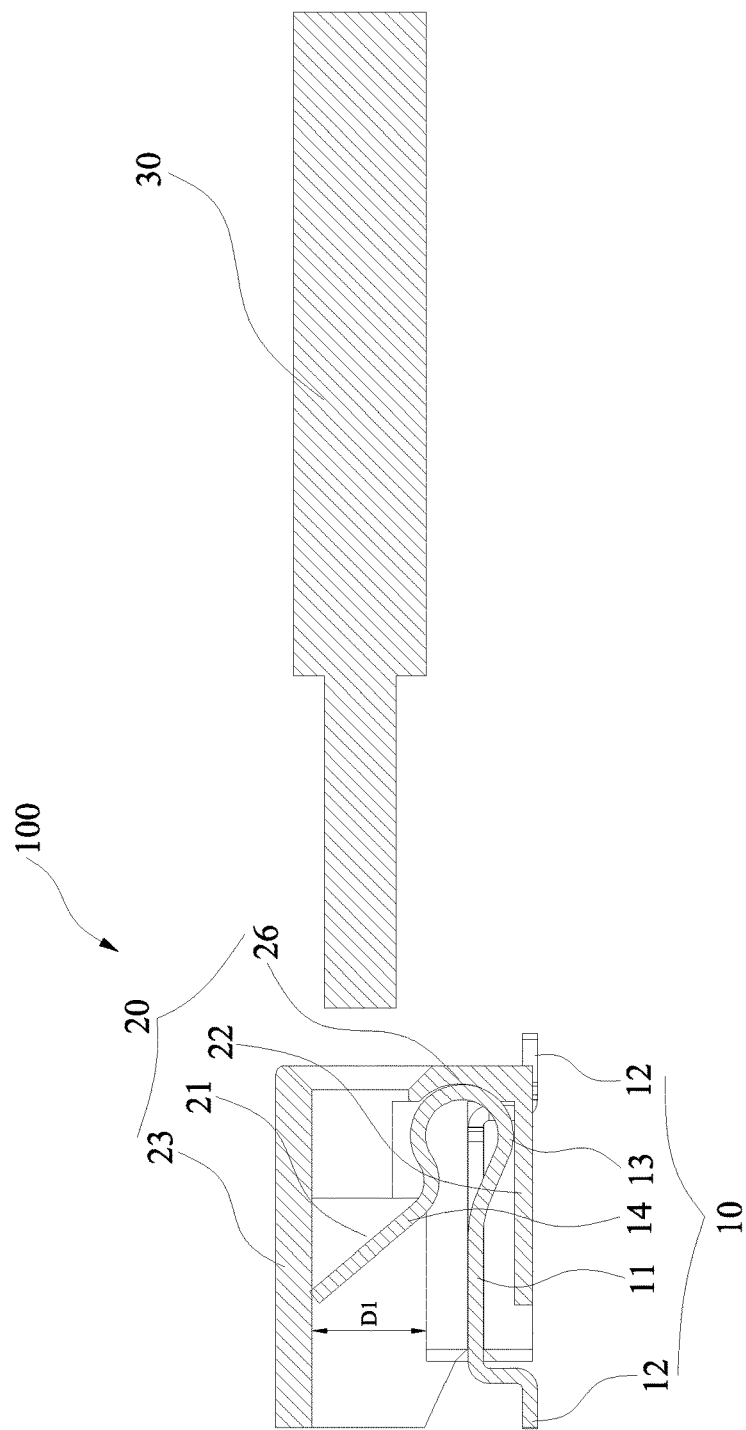
FIG. 3 is a cross-sectional view of a first embodiment of a connector according to the present invention.
Figure 4:
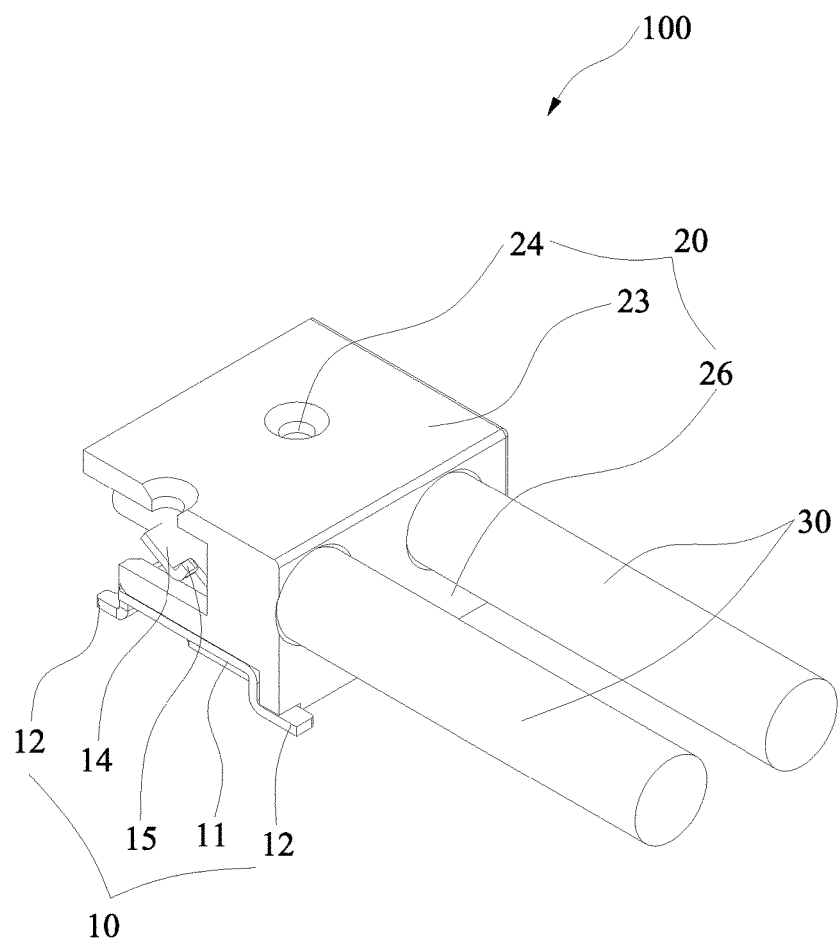
FIG. 4 is a perspective view of the first embodiment of the connector according to the present invention.
Figure 5:
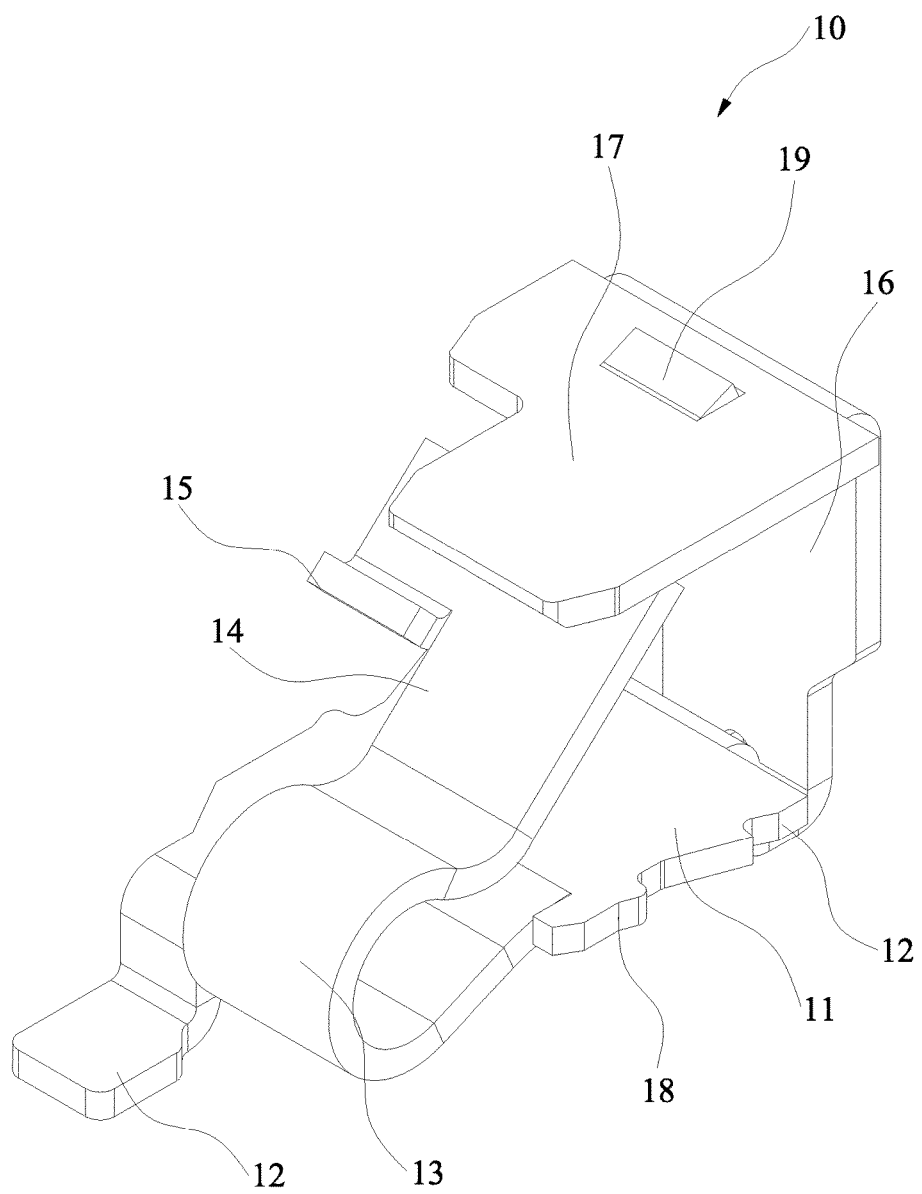
FIG. 5 is a perspective view of a second embodiment of the metal terminal according to the present invention.
Figure 6:
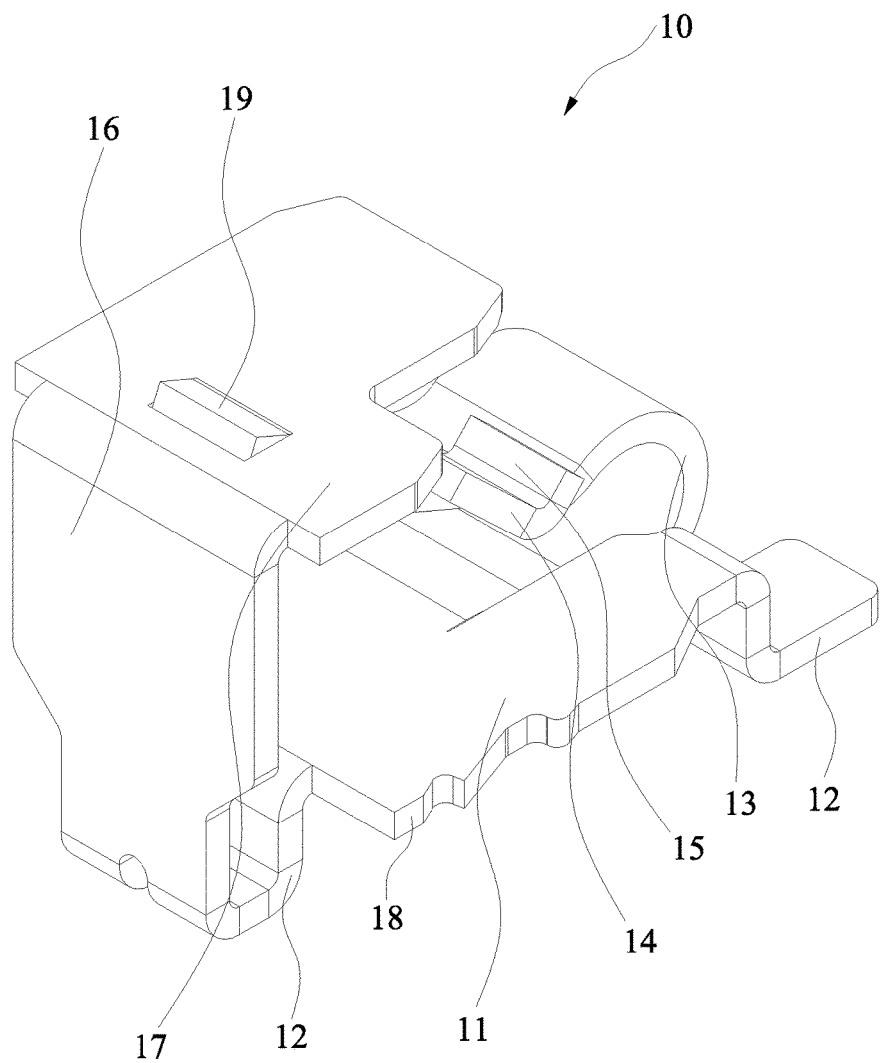
FIG. 6 is another perspective view of the second embodiment of the metal terminal according to the present invention.

Based on the first embodiment of the metal terminal 10, the present invention further discloses a pushbutton-equipped patch cord connector 100, which comprises the metal terminal 10 and a housing seat 20. The metal terminal 10 is just as described previously and repeated description is herein omitted. The housing seat 20 has a box-like shape with an accommodating chamber 21 running through its front and back. The metal terminal 10 is fixed in the accommodating chamber 21, with the weld legs 12 exposed at the bottom 22 of the housing seat 20 to contact a circuit board (a conventional component, not shown). The resilient arm 14 and the top 23 of the housing seat 20 is separated by a distance D1 allowing insertion. As shown in FIG. 3, D1 is measured from the bottom of the resilient arm 14 to the lower surface of the top 23. The housing seat 20 is formed with a push window 24 corresponding to the pushbutton 15 for easy push.

Figure 7:
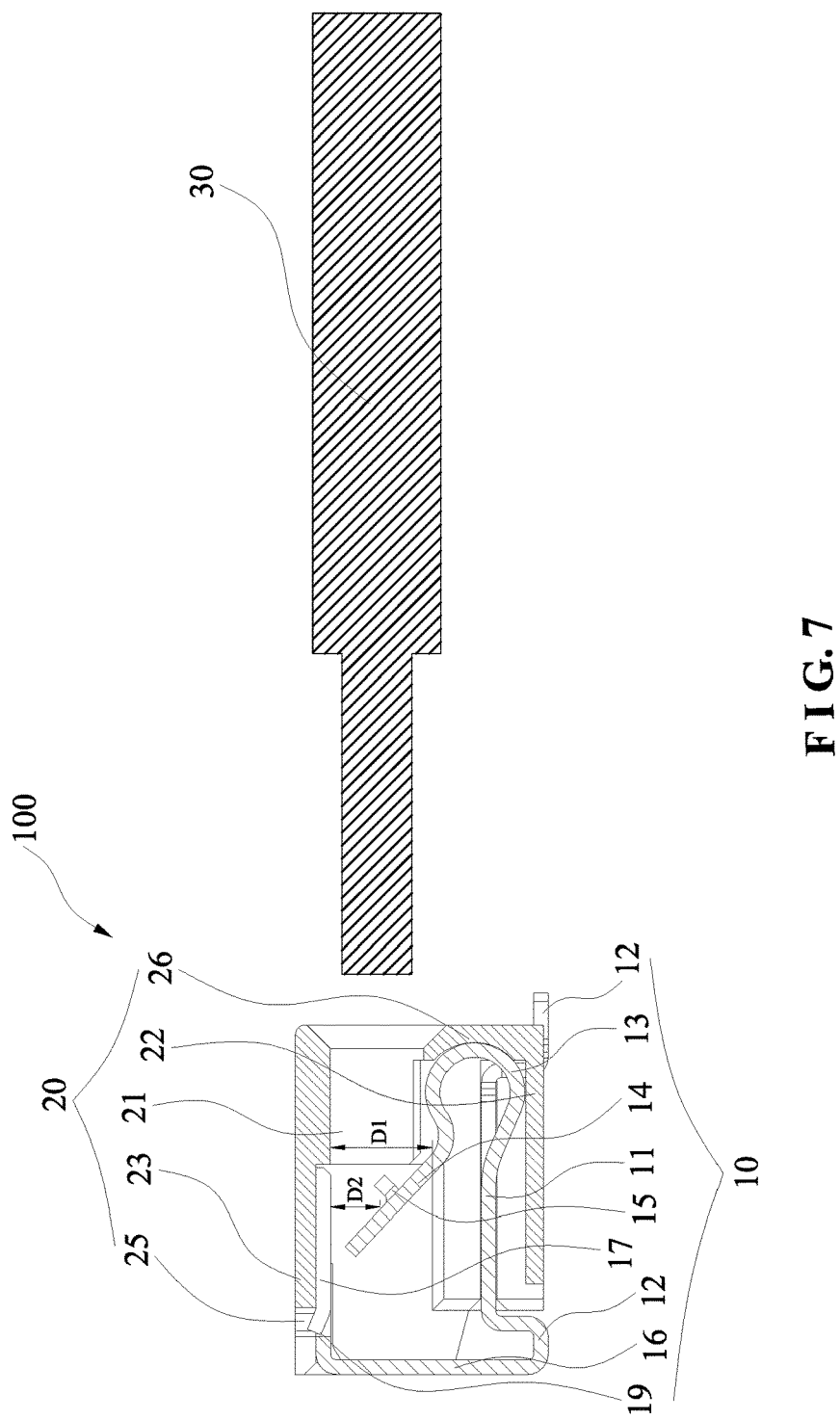
FIG. 7 is a cross-sectional view of a second embodiment of the connector according to the present invention.
Figure 8:
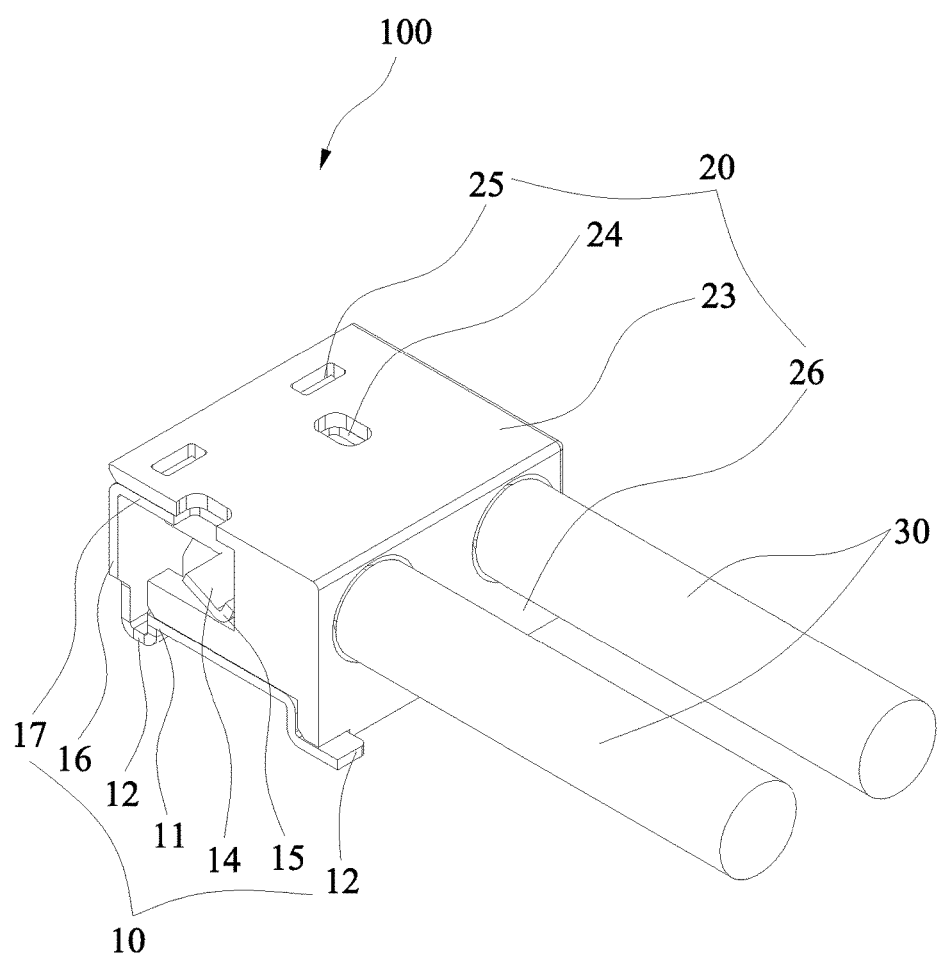
FIG. 8 is a perspective view of the second embodiment of the connector according to the present invention.

As shown in FIG. 5 through FIG. 8, in a second embodiment of the pushbutton-equipped patch cord connecting metal terminal 10 of the present invention, which is designed based on the previous embodiment, the weld legs 12 are formed at the front and rear ends of the base 1, by, for example, bending the front and rear ends of the base 1 downward to form the weld legs 12, with the weld leg 12 at the rear end having its tail end bent upward to form an upright brace 16. The top of the brace 16 is then bent forward to form a horizontal upper contact surface 17 that is parallel to a horizontal portion of the base 11 as shown in FIG. 7. The upper contact surface 17 is located above the resilient arm 14 without covering the pushbutton 15 so as not to interfere with the pushing operation. The upper contact surface 17 and the resilient arm 14 are separated by a distance D2 so as to provide upper and lower contacts for the patch cord 30 to connect. As shown in FIG. 7, D2 is measured from a point on the resilient arm 14 that is right above the pushbutton 15 to the lower surface of the upper contact surface 17.

Based on the second embodiment of the metal terminal 10, the present invention further discloses a pushbutton-equipped patch cord connector a 100. In its structure, what is identical to the first embodiment is not discussed any longer herein. Since the weld leg 12 at the rear end of the base 11 has its tail end extended and formed as the brace 16 and the upper contact surface 17, the upper contact surface 17 of the present embodiment shall be as close to the top 23 of the housing seat 20 as possible, so as to ensure good contact between the upper contact surface 17 and the patch cord 30.

In either of the two embodiments of the metal terminal 10, for ensuring stable assembly, barbs 18 may be further formed at two opposite laterals of the base 11. The metal terminal 10 uses the barbs 18 to have close fit with the inner walls of the housing seat 20, thereby being firmly positioned in the housing seat 20. The upper contact surface 17 is provided with a reverse hook 19, while the housing seat 20 has its top 23 formed with a hook eye 25. With the engagement between the reverse hook 19 and the hook eye 25, the upper contact surface 17 is fixed to the top 23 of the housing seat 20.

In addition, a barricade 26 may be formed at the front end of the housing seat 21 to positionally correspond to the arc-shaped resilient portion 13. The barricade 26 serves to provide an abutting force when the arc-shaped resilient portion 13 deforms, thereby further ensuring reliable electrical connection between the resilient arm 14 and the patch cord 30.

The disclosed metal terminal 10 is structurally simpler as compared to the prior art, and so is the connector 100. The both are easy to use and reliable. In use, the resilient arm 14 works with a component above it (which may be the top 23 of the housing seat 20, or another component positionally corresponding to the resilient arm 14) to firmly clamp the patch cord 30, and the arc-shaped resilient portion 13 at this time abuts upward against the patch cord 30, thereby securing the patch cord 30 and the established electrical connection. To remove the patch cord 30, a user can simply push the pushbutton 15, which in turn drives the contact between the resilient arm 14 and the patch cord 30 to move downward, and draw the patch cord 30 outward, so the operation is very easy.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A pushbutton-equipped patch cord connecting metal terminal being characterized in having a base on which weld legs are formed; the base having its front part bent backward to form an arc-shaped resilient portion, the arc-shaped resilient portion having its tail end extending backward to form a tilted resilient arm that forms the upper rear of the metal terminal so as to provide a contact for a patch cord to connect, and a pushbutton being formed at a lateral of the resilient arm.

2. The pushbutton-equipped patch cord connecting metal terminal of claim 1, wherein the base has its front and rear ends bent downward to form weld legs, and the weld leg at the rear end has its tail end bent upward to form an upright brace whose top is bent forward to form a horizontal upper contact surface that is parallel to the base, in which the upper contact surface is located above the resilient arm without covering the pushbutton, and the upper contact surface and the resilient arm are separated by a distance so as to provide upper and lower contacts for the patch cord to connect.

3. A pushbutton-equipped patch cord connector being characterized in comprising a metal terminal and a housing seat; the metal terminal having a base on which weld legs are formed, the base having its front part bent backward to form an arc-shaped resilient portion, the arc-shaped resilient portion having its tail end extending backward to form a tilted resilient arm that forms the upper rear of the metal terminal so as to provide a contact for a patch cord to connect, a pushbutton being formed at a lateral of the resilient arm; the housing seat having a box-like shape that has an accommodating chamber running through its front and back, the metal terminal being fixed in the accommodating chamber, the weld legs exposed at a bottom of the housing seat for a circuit board to connect, a bottom of the resilient arm and a lower surface of a top of the housing seat being separated by a distance for insertion, and the housing seat being provided with a push window corresponding to the pushbutton for easy pushing.

4. The pushbutton-equipped patch cord connector of claim 3, wherein barbs are formed at laterals of the base of the metal terminal, so that the barbs make the metal terminal come into close fit with inner walls of the housing seat and get firmly secured in the housing seat.

5. The pushbutton-equipped patch cord connector of claim 3, wherein the base has its front and rear ends bent downward to form weld legs, and the weld leg at the rear end has its tail end bent upward to form an upright brace whose top is bent forward to form a horizontal upper contact surface that is parallel to a horizontal portion of the base, in which the upper contact surface is located above the resilient arm without covering the pushbutton, and a lower surface of the upper contact surface and a point on the resilient arm that is right above the pushbutton are separated by a distance so as to provide upper and lower contacts for the patch cord to connect, in which the upper contact surface is close to the top of the housing seat.

6. The pushbutton-equipped patch cord connector of claim 5, wherein the upper contact surface is provided with a reverse hook, and the housing seat has its top provided with a hook eye, so that when the reverse hook and the hook eye are engaged with each other, the upper contact surface is secured to the top of the housing seat.

7. The pushbutton-equipped patch cord connector of claim 3, wherein the housing seat has its front end faulted with a barricade corresponding to the arc-shaped resilient portion.

\* \* \* \* \*